United States Patent
Bartel (10) Patent No.: US 6,729,115 B2
(45) Date of Patent: *May 4, 2004

(54) MOWER WITH COMBINED STEERING AN BRAKE LEVERS

(75) Inventor: Harlan J. Bartel, Newton, KS (US)

(73) Assignee: Excel Industries, Inc., Hesston, KS (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/185,573

(22) Filed: Jun. 27, 2002

(65) Prior Publication Data

US 2004/0000130 A1 Jan. 1, 2004

Related U.S. Application Data

(63) Continuation-in-part of application No. 09/834,131, filed on Apr. 13, 2002, now Pat. No. 6,434,917.

(51) Int. Cl.$^7$ .............................................. A01D 69/10
(52) U.S. Cl. ........................ 56/11.3; 56/14.7; 180/286; 180/315
(58) Field of Search .............................. 56/10.8, 11.3, 56/14.7, 16.7; 180/271, 272, 286, 305, 307, 315

(56) References Cited

U.S. PATENT DOCUMENTS

| | | | | |
|---|---|---|---|---|
| 3,702,051 A | * | 11/1972 | Deines | 56/11.3 |
| 5,496,226 A | * | 3/1996 | Splittstoesser et al. | 476/24 |
| 5,502,957 A | * | 4/1996 | Robertson | 56/11.9 |
| 5,894,714 A | * | 4/1999 | Braun et al. | 56/11.4 |
| 5,913,802 A | * | 6/1999 | Mullet et al. | 56/10.8 |
| 5,946,894 A | * | 9/1999 | Eavenson et al. | 56/16.7 |
| 6,056,074 A | * | 5/2000 | Heal et al. | 180/6.48 |
| 6,301,864 B1 | * | 10/2001 | Damie et al. | 56/11.3 |
| 6,343,668 B1 | * | 2/2002 | Dean | 180/315 |

* cited by examiner

Primary Examiner—Thomas B. Will
Assistant Examiner—Nathan Mammen
(74) Attorney, Agent, or Firm—Edward L. Brown, Jr.

(57) ABSTRACT

A twin-lever drive wheel steering mower for a sitting operator with each lever independently controlling a brake and the speed of each drive wheel through a separate hydraulic pump and motor transmission. A brake assembly positioned on each drive wheel; a pair of pivotally mounted steering levers, each controlling one of the pumps mounted on the mower for longitudinal movement, each steering lever is connected independently to the swash plate of its controlled pump providing variable speeds forward, reverse, and a neutral zero flow position; linkage members connecting the steering levers for each wheel to a brake assembly on each wheel; a pair of T-shaped slots having a lateral leg in a cover plate surrounding each of the steering levers allowing the levers to move laterally outward in the lateral leg to engage the brakes only in the neutral position.

6 Claims, 7 Drawing Sheets

MOWER WITH COMBINED STEERING AN BRAKE LEVERS

This is a CIP of application Ser. No. 09/834,131 filed Apr. 13, 2002, now U.S. Pat. No. 6,434,917.

FIELD OF THE INVENTION

This invention relates to drive wheel steering vehicles and more specifically to twin-lever drive wheel steering lawn mowers, wherein the steering levers also provide parking brakes.

DISCUSSION OF PRIOR ART

Drive wheel steering is a concept where the two drive wheels on fixed axles are rotated at different speeds to achieve turning. The drive wheels can also be rotated in different directions for a very sharp turn or even a zero turn radius which is when the mower actually turns about the mid point of the drive wheel axis. The other wheels on the mower are free-wheeling and castered which merely follow the drive wheels.

With drive wheel steering mowers, the mower becomes much more maneuverable than conventional vehicle steering. Hydraulically powered drive wheel mowers typically include a separate variable displacement axial piston hydraulic pump for each of the two fixed axle drive wheels. These variable displacement pumps include a tiltable swash plate which can vary the pump discharge rate from zero flow, referred to as neutral, up to a maximum flow or a reverse direction of flow. This variable flow rate takes the place of a transmission and a clutch. In drive wheel steering, the flow rates to the wheel motors control the turning speed of the wheels.

Drive wheel steering type mowers, have been around for at least 40 years and are typically controlled by a pair of side-by-side levers which move forward and aft from a neutral position to achieve variable speed and steering. These two essentially vertically positioned levers can be positioned close together between the operator's knees or positioned out to the sides of the operator, as in the present invention, with horizontal gripping portions extending in toward the center of the mower for easy side-by-side gripping. Each lever independently controls the speed of one of the drive wheels which permits a variety of maneuvers including rotating one wheel forward while rotating the other backward, which causes the mower to turn within its own dimensions. These types of mowers are generally referred to as zero turning radius mowers.

Parking brakes for hydraulically powered drive wheel steering mowers in the prior art are typically independent brakes of the nature of a hand brake in an automobile. If no power is being supplied to the pump, there is no braking action, so if the mower is on an incline, it will begin to roll. Prior art hydraulic drive wheel steering machines typically have a separate independent park brake lever which is either set by a pedal or by a locking hand lever. However, if the operator forgets to set the parking brake on an unpowered mower, there is a danger that the mower may roll if it is on a slight incline. If the engine is running in the neutral position, the motors are pressurized equally so the machine will not roll.

SUMMARY OF THE PRESENT INVENTION

The present invention alleviates the potential rolling problem of the mower when the engine is not running with the provision of a parking brake on each drive wheel which is activated by moving the steering levers outward so that the operator can dismount the machine. The movement of each steering lever outward sets the brake on each drive wheel, thereby preventing a potential accident.

The steering levers for both wheels are each connected through a series of linkages to the pump control for altering the flow rate from zero flow, either forward or backward, to a maximum flow rate or some speed in-between. Also connected to each steering lever is a second linkage which engages or releases a brake on each wheel. These two different functions which the steering levers perform are effected by two distinctive separate movements. To cause the mower to move forward or backward, the steering levers are moved longitudinally forward in a vertical plane from the neutral position or longitudinally backward in the same plane for moving in reverse.

To engage the brake, the steering lever is moved laterally outward 45 degrees in a plane normal to the previously mentioned longitudinal plane. This lateral movement is only possible when the steering lever is in the neutral position. The hand engaging portions of the steering levers in the running position are horizontally positioned in front of the operator, thus blocking his egress from the mower. By rotating the steering levers laterally outward from the neutral position, the brakes on both wheels are engaged and the mower is safe to leave unattended.

When engaging the brakes, the steering levers are rotated outward through 45 degrees of travel, thus causing the brake lever extension to rotate 13 degrees. By reason of the mechanical advantage of the moment arms and overall geometry of the linkage, a 10 to 1 mechanical advantage can be obtained when setting the brakes through manual rotation of the steering levers. When the steering levers are moved longitudinally for steering, there is no movement of the brake linkage.

The principal advantage of the present invention is to provide a twin-lever drive wheel steering mower wherein the movement of the steering levers provides speed control as well as setting the park brake when the levers are locked in neutral.

Another object of the present invention is to provide steering lever geometry which necessitates setting the brakes prior to egress from the mower.

A further object of the present invention is to provide a riding mower with a high degree of safety when the operator dismounts the mower.

DESCRIPTION OF THE PREFERRED EMBODIMENT

Figure 1:
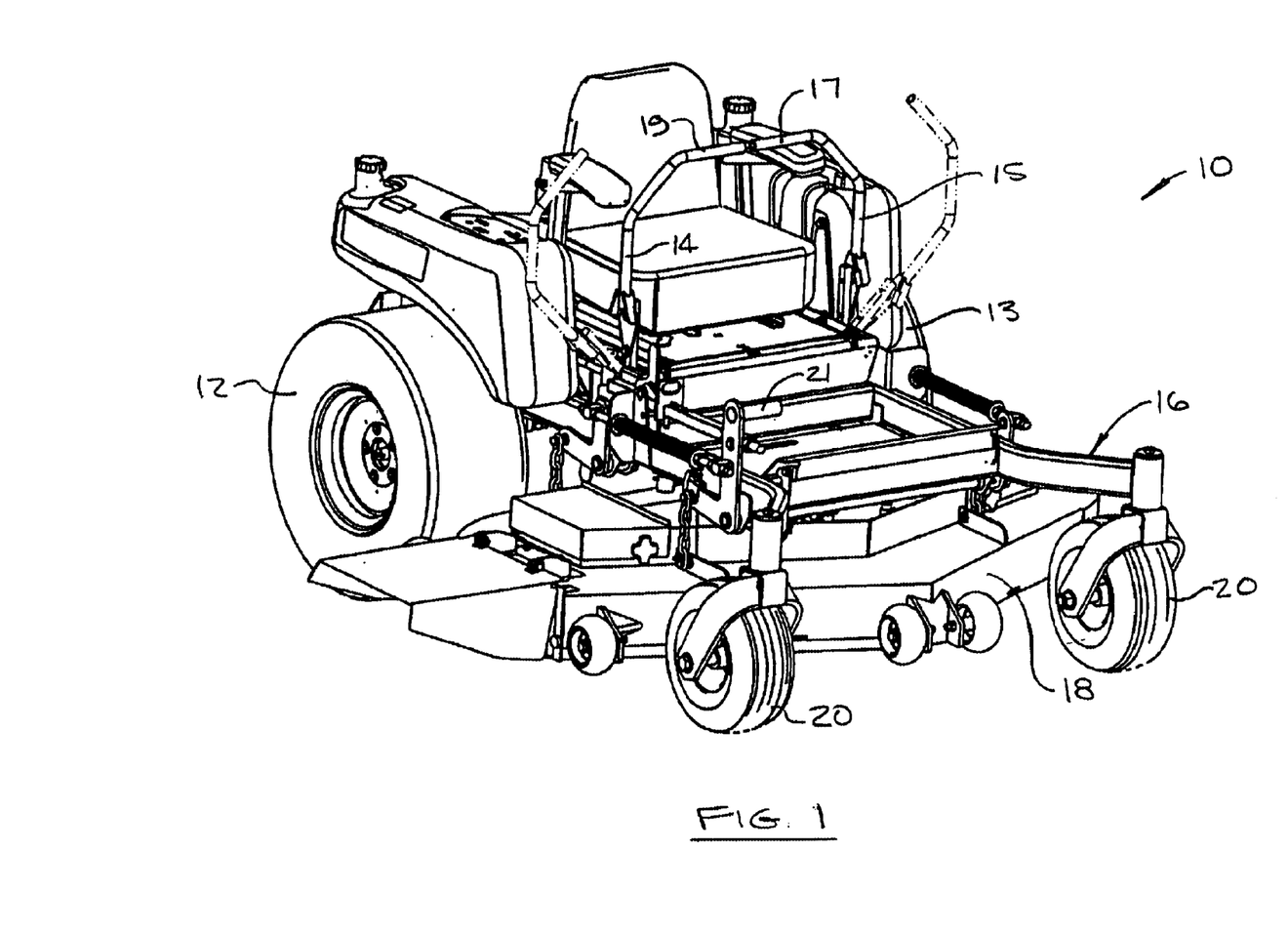
FIG. 1 is a right front perspective view of the twin-lever power mower of the present invention with the steering levers shown in dotted line when the parking brakes are set.

The twin-lever drive wheel steering mower of the present invention is generally described by reference numeral 10 and as shown in FIG. 1. The mower includes a pair of drive wheels 12 and 13, each of which are individually powered hydraulically by hydrostatic pumps 22 and 24 not shown in FIG. 1 through the movement of adjacent steering levers 14 and 15 rotatably attached to the mower. The mower 10 is built on a frame 16 which supports a conventional multi-blade deck 18 which in turn is supported by an adjustable height mechanism 21, all of which is generally considered known in the art and therefore not described in detail. A pair of caster wheels 20 are located on the front of the mower frame which move as dictated by the drive wheels 12 and 13. The remaining structure illustrated in FIG. 1 is also well known in the prior art and therefore not discussed. The pair of steering levers 14 and 15 control the direction and movement of the mower through a pair of similar axial piston variable displacement pumps 22 and 24, as shown in FIGS. 2 through 5. FIGS. 2 through 5 are shown with substantial portions of the mower removed so that the portions of the mower illustrating the present invention are better seen.

Figure 4:
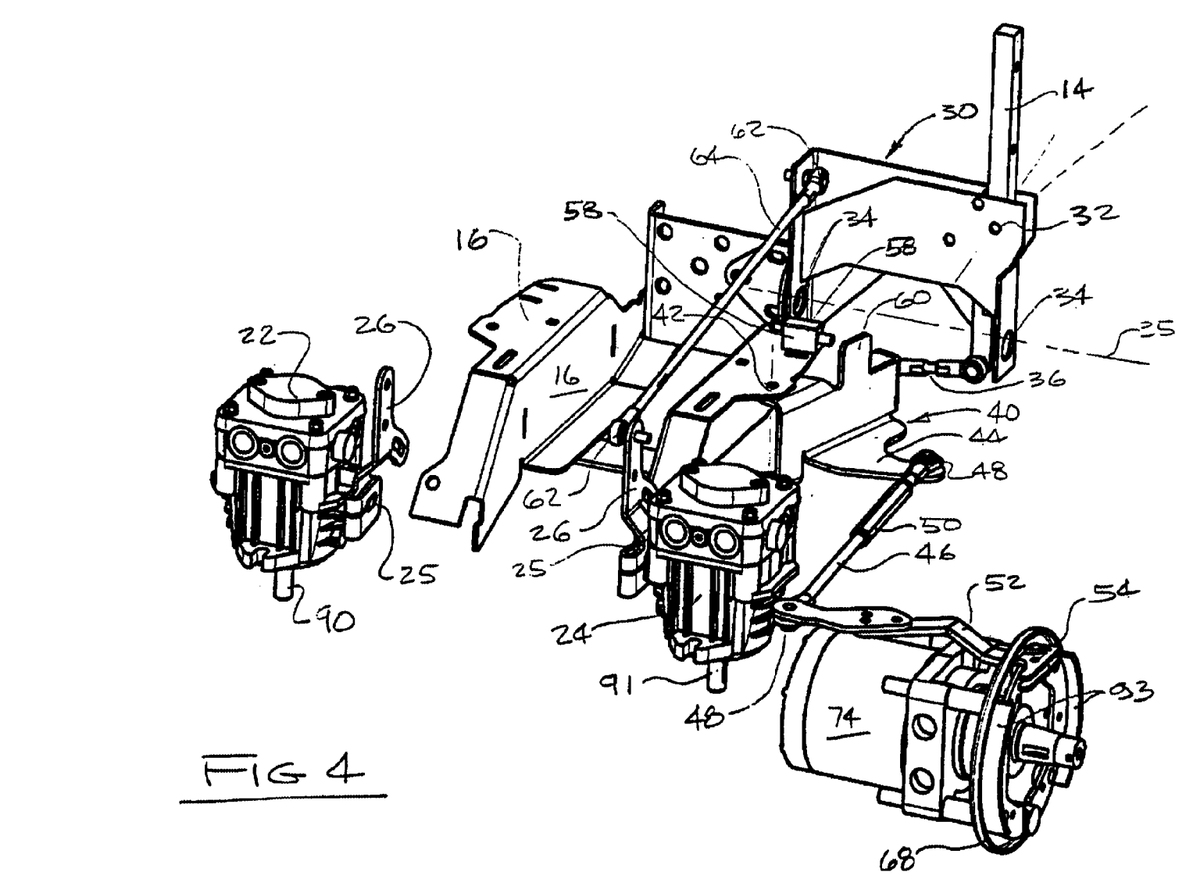
FIG. 4 is a forward perspective view of the same connecting linkage as shown in FIG. 2 with the steering arm neutrally positioned.

Axial piston variable displacement pumps are well known in the prior art as power sources which also function as transmissions. Variable flow pumps are controlled by swash plate positioning shaft 25 which positions a swash plate within the pump as shown in FIG. 4. When the swash plate is positioned normal to the pistons of the pump with the pump running, the flow rate of the pump is zero flow, also called neutral, and as the swash plate is tilted forward, the flow begins to increase up to a maximum level of tilt, and if the swash plate is tilted backward, the flow is reversed, thereby providing an infinite number of speeds for the vehicle being driven either forward or backward.

Figure 2:
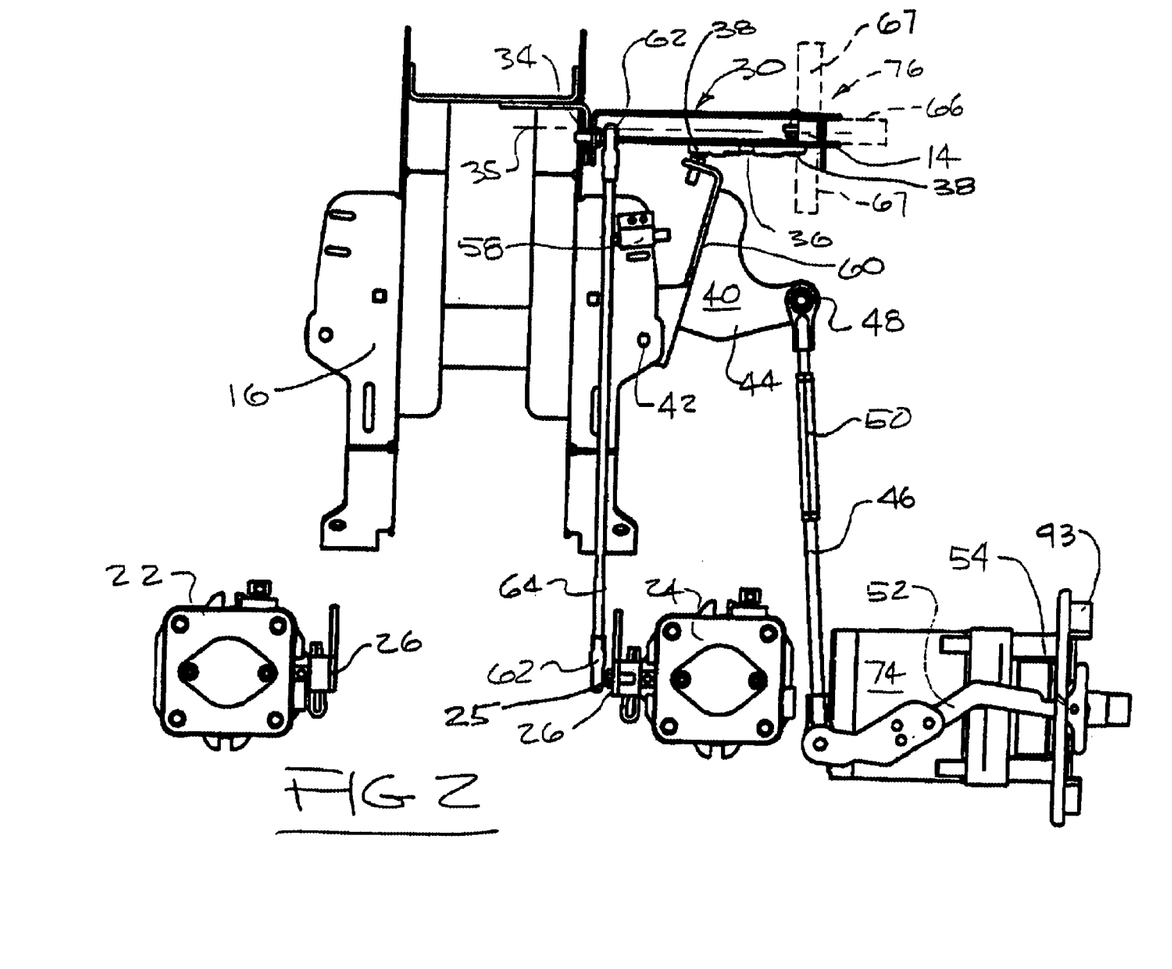
FIG. 2 is a partial top plan view to an enlarged scale of a single steering lever and its connecting linkage, with the pump swash plate and the parking brake with portions of the mower removed.
Figure 3:
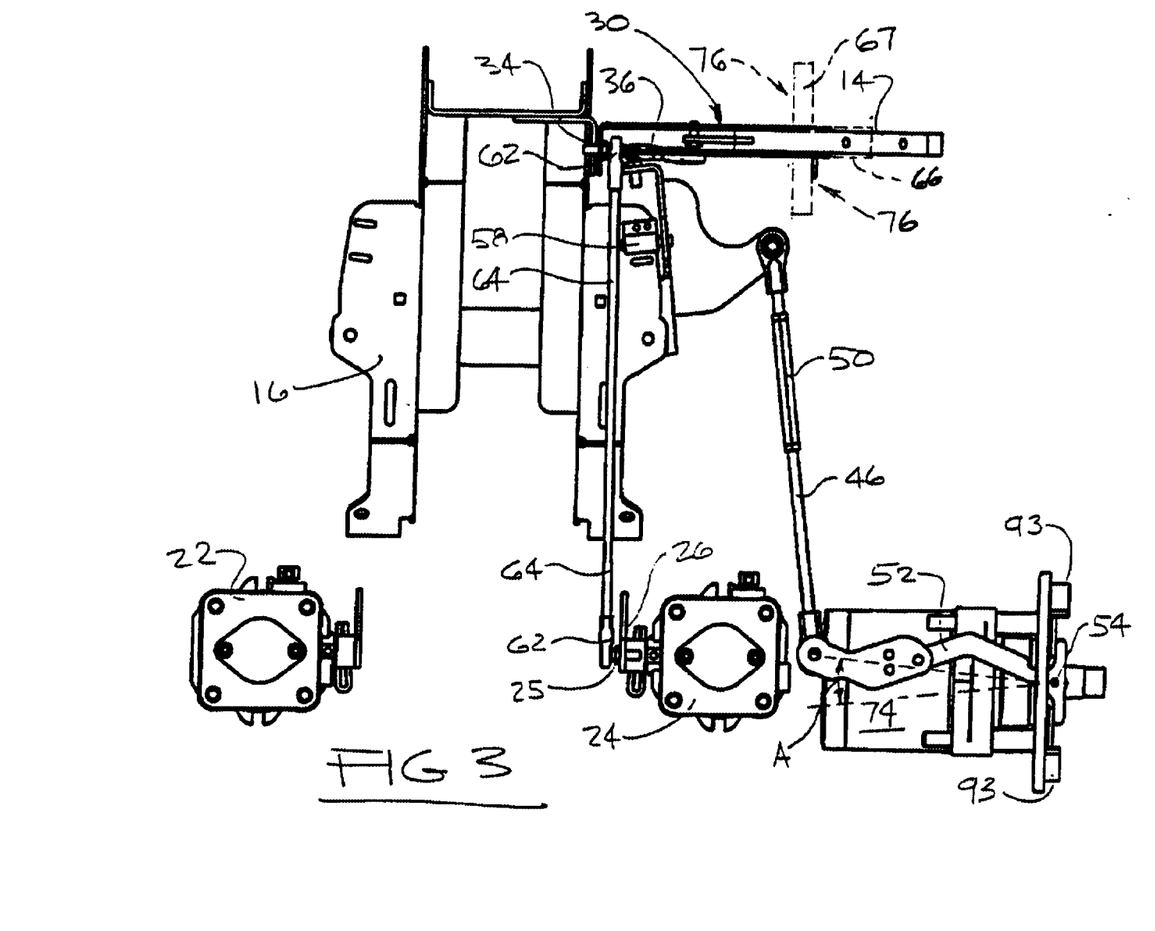
FIG. 3 is a partial top plan view similar to FIG. 2 with the steering arm in the brake set position.

In FIG. 4, swash plate positioning shaft 25 extending outwardly from pumps 24 and 22 are attached to a vertically positioned swash plate pivot arm 26. Arm 26 is positioned by steering lever 14 through connecting rod 64, ball joint 62, and steering lever support base 30. Steering lever 14 is pivotally mounted to support base 30 for movement in a lateral plane, as indicated by angle B in FIG. 5. Steering lever 14 is also rotatable in a vertical longitudinal plane about pivots 34 which pivotally mount support base 30 to the frame 16 of the mower. Steering lever 14's longitudinal movement controls the fluid output from pump 24 by positioning swash plate pivot arm 26. The fluid output from pump 24 is directed to a hydraulic wheel motor 74, as shown in FIG. 2, which in turn drives wheel 12.

Steering lever 14 also controls the setting of a parking brake on the wheel 12 through the following linkage. Connected to the lower end of lever 14, as seen in FIG. 4, is a connecting rod 36 with ball joints 38 at both ends which in turn is connected to brake pivot crank 40. Crank 40 is pivotally mounted to the frame 16 of the mower at pivots 42 and includes an additional arm 44 which is pivotally connected to connecting rod 46 which in turn pivotally connects to brake lever 52. Brake lever 52 rotates about pivot 54 through approximately 13 degrees when the brake is set which amounts to 1.5 inches of travel at the long end 83 of the lever 52. The camming surfaces 78 and 80, as shown in FIG. 6, surround pivot 54 and engage the brake shoes ends 82 of a conventional design and are not shown in detail. The wheel side plate 68, as shown in FIGS. 4 and 5 attaches to the frame of the mower adjacent the axle wheel bearing and hydraulic motor 74 and are all concentrically aligned.

Figure 5:
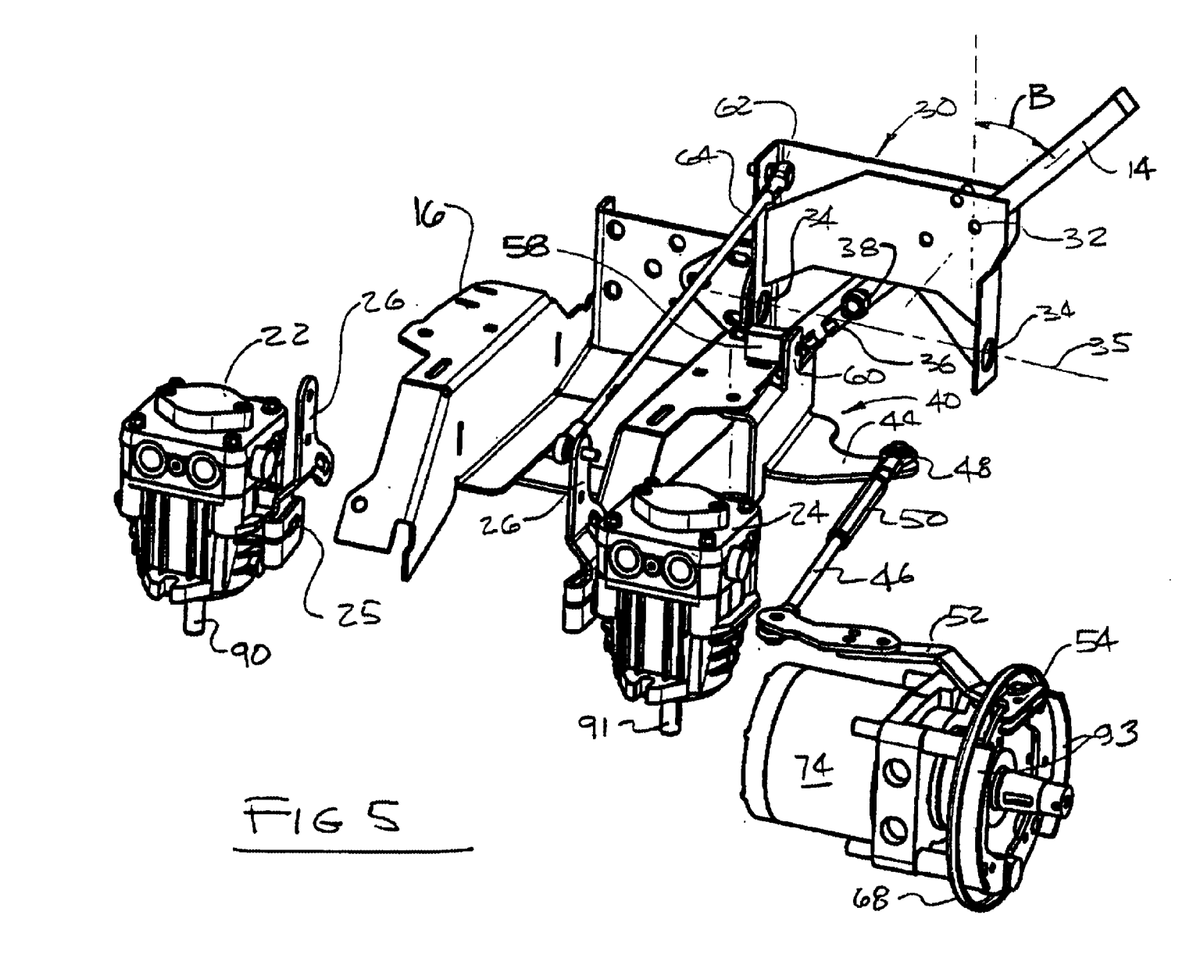
FIG. 5 is a perspective view similar to FIG. 4 with the steering arm in the brake engaging FIG. 3 position.
Figure 6:
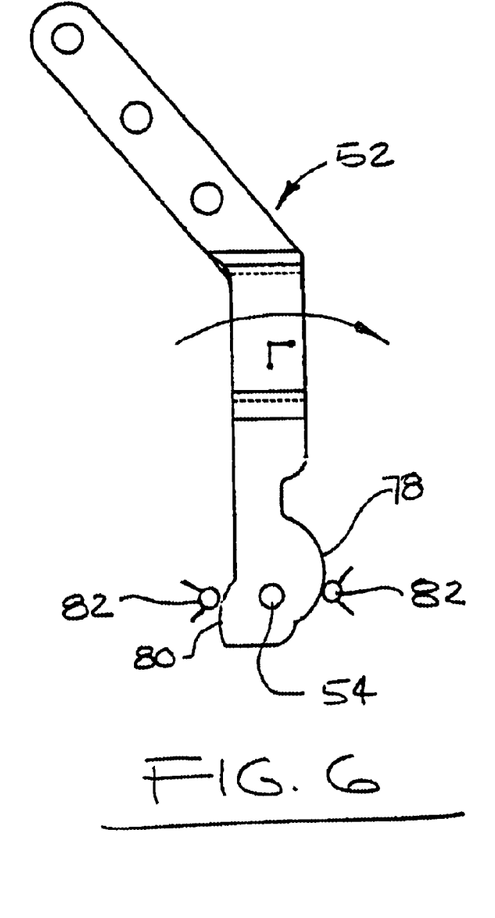
FIG. 6 is a plan view to an enlarged scale of the brake lever extension with its camming surfaces.

The steering lever 14 sets the parking brake by clockwise rotation of lever 14 through 45 degrees, which is shown in FIG. 5 as angle B, to set the brake. The rotational movement of steering lever 14 is restricted by a T-shaped slot 76, shown in FIGS. 2 and 3. The slot 76 is in a stationary cover plate, not shown, which contains and limits the movements of lever 14. The parking brake can only be set with the steering lever 14 in the neutral position, which is defined by lateral leg 66 of the T-slot 76. The adjustment of the neutral position is by an adjustable turn buckle made up of link 64 and ball joints 62 on opposite ends. Rotation of ling 64 in the threaded ends of ball joints 62 which have right hand threads on one ball joing and left hand threads on the other together function as a turn buckle.

While FIGS. 2 through 5 only illustrate steering lever 14 and its associated linkages, steering lever 15 on the opposite side which controls drive wheel 13 is identical to all the parts illustrated with steering lever 14 and its connecting structure.

Figure 7:
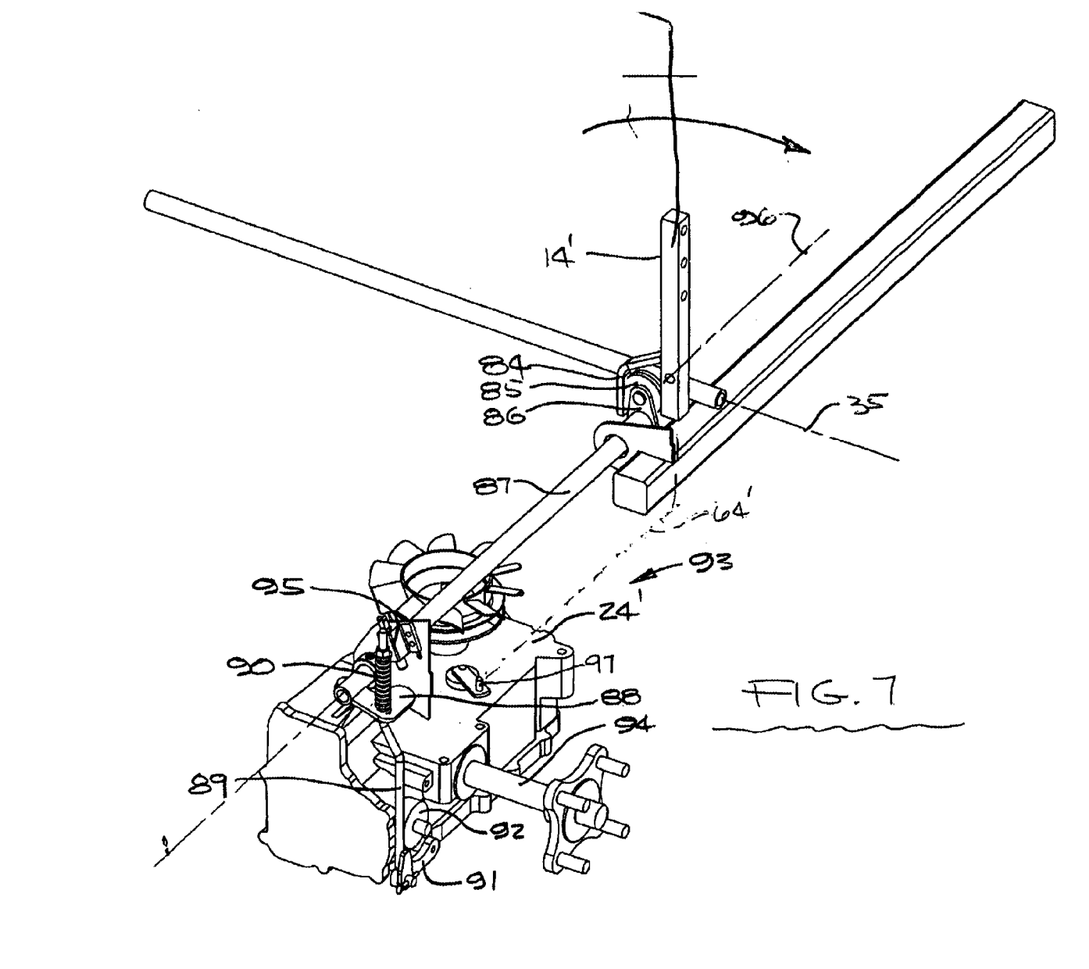
FIG. 7 is a perspective view of a modified version of the connecting linkage between the steering levers and the braking assembly of the hydraulic pump and motor transmission.

A modified linkage between the steering lever 14' and pump 24' is illustrated in FIG. 7. Located at the lower end of steering lever 14' is a fork 84 which engages a roller 85. Steering lever 14' rotates about axis 96. Roller 85 is mounted on the end of lug 86 which in turn is mounted on rotable shaft 87. At the opposite end of shaft 87 is an offset lever 88 which in turn engages a spring biased link 89. Link 89 pivotally attaches to a locking pawl 91. Pawl 91 is pivotally mounted on the pump-motor transmission 93 and when pawl 91 is lifted upwards as seen in FIG. 7, it engages a gear 92 which in turn is tied to the rotation of wheel axle 94. When the teeth of locking pawl 91 engage gear 92, the wheel axle is locked against rotation and thereby forms a brake for that wheel.

In viewing FIG. 7, when steering lever 14' is rotated clockwise about axis 96 into its outward position so the operator can dismount the mower, fork 84 causes roller 85 to rotate shaft 87 in a counterclockwise direction which lifts locking pawl 91 into locking engagement with gear 92 thereby locking wheel axle 94 from rotation.

In FIGS. 2 through 5, the hydrostatic transmission includes a separate pump 24 and wheel motor 74 while in the FIG. 7 version, the pump and motor are combined in a single unit 93 which functions in the same manner as the separate pumps and motors disclosed in FIGS. 2 through 5.

When the mower is in a storage, non-use position, the steering levers 14 and 15 are normally rotated outwardly 45 degrees to the dotted line positions shown in FIG. 1. In this position, the parking brakes are engaged, as illustrated in FIG. 5 or the wheel axle 94 is locked up as shown in FIGS. 7. Before the engine can be started, microswtich 58 must be closed, as seen in FIG. 5 and microswitch 95 in FIG. 7. In FIG. 7, swash plate pivot arm 97 is actuated by a similar connecting rod 64 as shown in FIG. 4. Since the parking brakes must be set before the engine will start, T-slot leg 66 of FIGS. 2 and 3 guarantees that the hydraulic pumps will be in their neutral position so as to prevent any possible movement of the mower. Once the engine has been started and the operator is in place, the two steering levers 14 and 15 are swung laterally inward to the full-line position illustrated in FIG. 1. Once in this position, the steering levers are out of the lateral slot 66 and are free to move longitudinally in legs 67 of T-shaped slot 76 for forward or backward movement. If the operator is not in the seat when the levers are moved to the full-line position, the engine will stop since a seat switch, not shown, has not been closed.

To move the mower forward in a straight line, levers 14 and 15 are slowly rotated forward through the same degree of rotation, thus causing both drive wheels to turn at the same speed. To stop the movement, the levers are returned to neutral and the pumps' flow reduction brakes the mower. If a right turn is desired, the left steering lever 15 must be advanced ahead of the right steering lever 14. When it is desirous to back up the mower, both steering levers 14 and 15 are pulled backward the same degree, thus causing the mower to back up. If it is desirous to turn the mower about a zero radius turn to the right, the left steering lever 15 is moved forward while the right steering lever 14 is moved backward, both to the same degree, which causes the wheels to turn in opposite directions at the same speed, thus turning the mower about the center point between both drive wheels.

When it is desirous to leave the mower, steering levers 14 and 15 are returned to the neutral position and then rotated laterally outward to the dotted line position, as seen in FIG. 1, thus setting the parking brake and also locking the pumps in their neutral no flow position. Since the horizontal extensions 17 and 19 of steering levers 15 and 14 are positioned in front of the operator, it is very difficult for the operator to leave the mower without setting the parking brakes.

From the above description of the invention, those skilled in the art will perceive the improvements, changes and modifications. Such improvements, changes and modifications within the skill of the art are intended to be covered by the appended claims.

We claim:

1. A twin-lever drive wheel steering mower for a sitting operator with each lever independently controlling the speed of each drive wheel through a separate hydraulic pump and motor transmission comprising:

a frame supporting two drive wheels;

a pair of variable flow hydraulic pumps controlled by a rotatable swash plate, each pump is connected to a drive wheel through a hydraulic motor, each hydraulic motor driving one of a pair of drive wheels in forward, reverse, and neutral conditions;

a braking member acting on each drive wheel;

a pair of steering levers pivotally mounted on the frame for longitudinal movement in forward and reverse conditions and lateral outward movement in a neutral condition, with each steering lever controlling one of said pumps, each steering lever is connected independently to its pump to produce variable speeds forward and reverse, and a neutral position;

linkage members interconnecting the steering levers for each wheel and an associated brake whereby in said neutral position, lateral outward movement of the steering lever actuates the brake.

2. A twin-lever drive wheel steering mower, as set forth in claim 1, wherein the linkage members include a gear connected in driving relation with each hydraulic motor and a locking pawl which releasably engages said gear for locking each wheel from rotation.

3. A twin-lever drive wheel steering mower, as set forth in claim 1, wherein the steering levers in their forward and reverse positions substantially surround the operator, and in the neutral position the levers can be moved laterally outward allowing ingress and egress of the operator.

4. A twin lever drive wheel steering mower, as set forth in claim 1, wherein the steering levers are generally vertically positioned in operative positions with horizontally positioned hand grip portions extending toward the center of the mower.

5. A twin-lever drive wheel steering mower for a sitting operator with each lever independently controlling the speed of each drive wheel through a separate hydraulic pump and motor transmission comprising:

a frame supporting two drive wheels;

a pair of variable flow hydraulic pumps controlled by a rotatable swash plate, each pump is connected to a drive wheel through a hydraulic motor, each hydraulic motor driving one of a pair of drive wheels in forward, reverse and neutral conditions;

a brake member acting on each drive wheel;

a pair of pivotally mounted steering levers, each controlling one of said pumps mounted on the mower for longitudinal movement; each steering lever is connected independently to the swash plate of its controlled pump providing variable speeds forward, reverse and neutral;

linkage members connecting the steering levers for each wheel to said brake member acting on each wheel, the linkage members permitting lateral outward movement of one or both steering levers which lock one or both wheels from rotation; and lateral slots adjacent each of the steering levers allowing the levers to move laterally outward only in the neutral position.

6. A twin-lever drive wheel steering mower for a sitting operator with each lever independently controlling the speed of each drive wheel through a separate hydraulic pump and motor transmission comprising:

a frame supporting two drive wheels;

a pair of variable flow hydraulic pumps controlled by a rotatable swash plate, each pump is connected to a drive wheel through a hydraulic motor, each motor driving one of a pair of drive wheels in a forward, reverse, and neutral zero flow condition;

a pair of gears each one connected in driving relation to one of said hydraulic motors;

a pair of locking pawls one on each hydraulic motor which releasably engage said gear for locking each drive wheel from rotation;

a pair of pivotally mounted steering levers, each controlling one of said pumps mounted on the mower for longitudinal movement, each steering lever is connected independently to the swash plate of its controlled pump providing variable flow for movement forward, reverse, and neutral;

linkage members connecting the steering levers for each wheel to one of said locking pawl on each wheel motor, the linkage members permitting lateral outward movement of one or both steering levers which lock one or both of the wheels from rotation; and lateral slots adjacent each of the steering levers allowing the levers to move laterally outward only in the neutral position.

* * * * *

UNITED STATES PATENT AND TRADEMARK OFFICE
CERTIFICATE OF CORRECTION

PATENT NO.  : 6,729,115 B2
DATED       : May 4, 2004
INVENTOR(S) : Harlan J. Bartel It is certified that error appears in the above-identified patent and that said Letters Patent is hereby corrected as shown below:

<u>Title page, Item [54] and Column 1, line 2,</u>
Title, should read -- MOWER WITH COMBINED STEERING AND BRAKE LEVERS --

Signed and Sealed this

Sixth Day of July, 2004

JON W. DUDAS
*Acting Director of the United States Patent and Trademark Office*